(12) United States Patent
Suzuki

(10) Patent No.: US 7,345,695 B2
(45) Date of Patent: Mar. 18, 2008

(54) IMAGE-FORMING DEVICE

(75) Inventor: Shogo Suzuki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 406 days.

(21) Appl. No.: 11/114,120

(22) Filed: Apr. 26, 2005

(65) Prior Publication Data
US 2005/0248648 A1 Nov. 10, 2005

(30) Foreign Application Priority Data
Apr. 27, 2004 (JP) ............................. 2004-132152

(51) Int. Cl.
*B41J 2/44* (2006.01)
*G02B 26/10* (2006.01)

(52) U.S. Cl. ...................... 347/235; 347/250
(58) Field of Classification Search ................ 347/235, 347/250; 359/212, 226
See application file for complete search history.

(56) References Cited
U.S. PATENT DOCUMENTS
6,055,010 A * 4/2000 Rockwell et al. ............ 347/250

FOREIGN PATENT DOCUMENTS
JP A 11-218697 8/1999
JP A 2002-006246 1/2002

* cited by examiner

*Primary Examiner*—Huan Tran
(74) *Attorney, Agent, or Firm*—Oliff & Berridge, PLC

(57) ABSTRACT

A scanning unit of an image-forming device has a polygon mirror for deflecting a laser beam across the surface of a photosensitive member. A disc that rotates together with the polygon mirror is provided with a reference mark. When the reference mark passes a photointerrupter, the photointerrupter detects the rotating position of the polygon mirror. A counter measures the number of pulses in a reference clock from the moment the photointerrupter detects the reference mark until a sensor provided in a measuring device detects the laser beam deflected by the polygon mirror, and the value of the counter is stored in memory as timing data. When the scanning unit is subsequently mounted in an image-forming device, the count value stored in memory is used to control the exposure timing for irradiating the photosensitive member in the image-forming device with the laser beam.

17 Claims, 14 Drawing Sheets

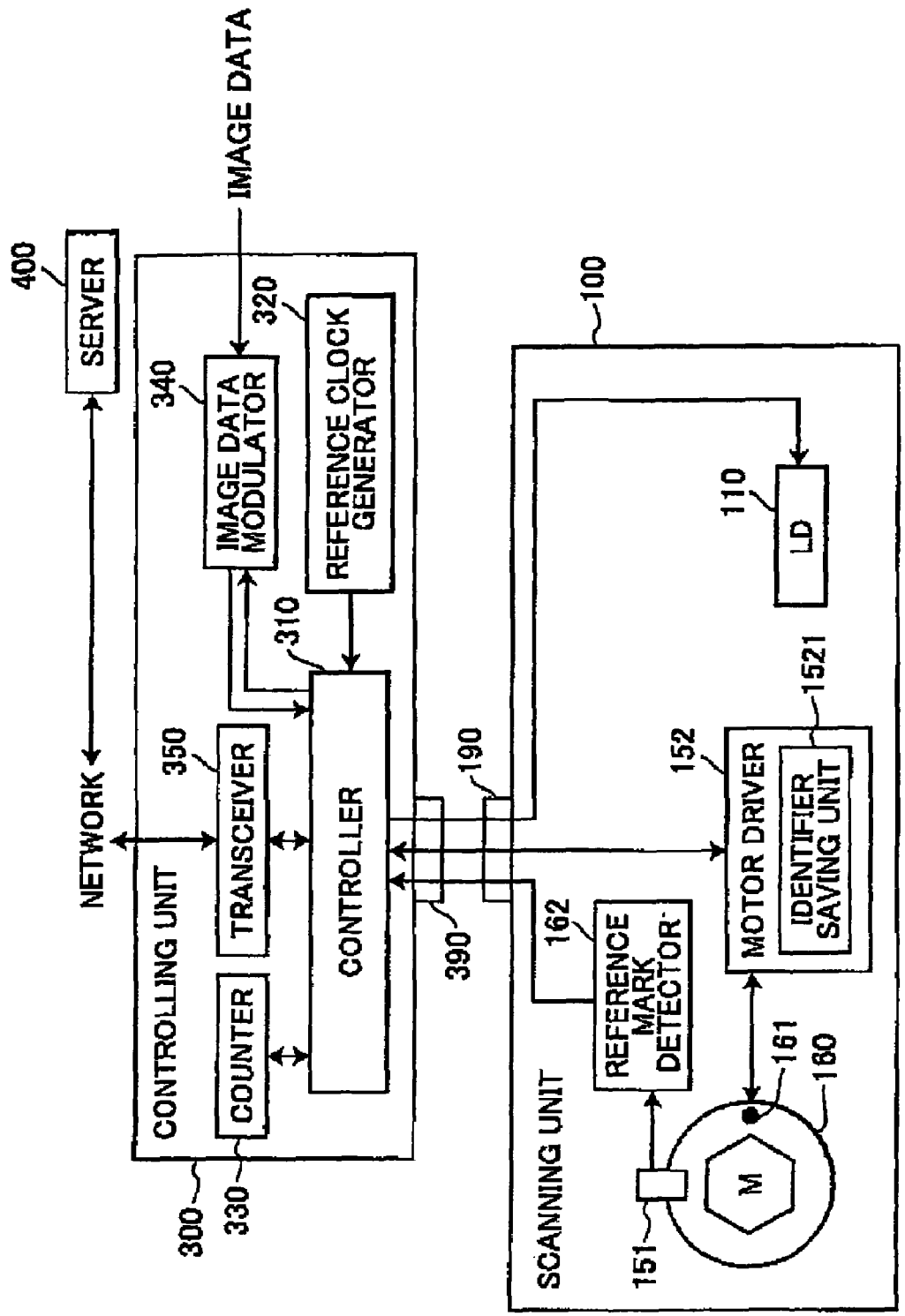

IMAGE-FORMING DEVICE

BACKGROUND OF THE INVENTION

1. Field of the Invention

The present invention relates to an image-forcing device, particularly, to a scanning unit installed in the image forming device for deflecting a light beam and scanning a surface of a photosensitive member with the deflected light beam.

2. Description of the Related Art

In a conventional electrophotographic image-forming device such as a laser printer, a light-emitting unit provided with a laser diode irradiates a laser beam onto the surface of a photosensitive member carrying a uniform electrical charge, forming an electrostatic latent image thereon. The latent image is developed into a visible image with toner, and the resulting toner image is transferred onto a sheet of paper or other recording medium to form images thereon.

Generally, this type of image-forming device scans the laser beam over the surface of the photosensitive member by deflecting the laser beam with a polygon mirror rotating at a high rate of speed. In order to control the timing at which the beam emitted from the light-emitting unit starts irradiating at an appropriate position on the surface of the photosensitive member, a beam detect sensor (BD sensor) is commonly used to detect when the deflected light beam has passed a prescribed position outside the photosensitive member. When a prescribed time has elapsed after the BD sensor detects the light beam, the deflected light beam starts scanning on the photosensitive member being modulated with image data to form an electrostatic latent image at an appropriate position on the surface of the photosensitive member.

However, conventional BD sensors are less sensitive than the photosensitive members. In addition, the sensing level of the BD sensors to detect the light beam having a light intensity for exposing the photosensitive member is not stable. For these reasons, Japanese unexamined patent application publications 11-218697 and 2002-6246 disclose an image exposure device eliminating the usage of the BD sensor.

The image exposure device disclosed in Japanese unexamined patent application publication 2002-6246 includes a transparent disc provided integrally and concentrically with the polygon mirror, a reference mark formed of an opaque material disposed at a prescribed location on the transparent disc, a photointerrupter for detecting the reference mark, and a pulse generator for generating pulses. A start signal is generated at a time t1 in synchronism with the first pulse generated by the pulse generator after the reference mark has been detected, The scanning process begins at a time t2 after a prescribed time duration ΔT after the time t1.

Further, manufacturing errors in the polygon mirror cannot be ignored when deflecting a light beam with the mirror. For example, as disclosed in Japanese unexamined patent application publication 2002-6246, when the time duration ΔT again elapses after the time t4, which comes after a prescribed number of drive pulses from the time t1 of the start signal, manufacturing errors in the polygon mirror can cause the exposure position to become slightly offset with each scanning line. The conventional technologies described above do not account for manufacturing error of each flat reflecting surface of the polygon mirror which is inherent in individual polygon mirrors.

In view of the foregoing, it is an object of the present invention to provide an image-forming device that precisely controls scanning a photosensitive member with a light beam modulated by image data to be formed.

SUMMARY OF THE INVENTION

The present invention provides an image-forming device having a photosensitive member and a scanning unit that scan the photosensitive member with a light beam. The scanning unit has a light emitting unit that emits the light beam; a polygon mirror having a plurality of facets, each of the plurality of facets deflects the light beam to the photosensitive member; a driving unit that rotates the polygon mirror; a reference mark that revolves together with the polygon mirror, the reference mark indicating a reference position of the polygon mirror; a reference mark detecting unit that detects the reference mark; and a memory unit that saves a length of a time period from a first time to a second time for one of the plurality of facets when the polygon mirror is rotating. The first time is when the reference mark detecting unit detects the reference mark. The second time is when the light beam deflected by the one of the plurality of facets arrives at the photosensitive member. The image-forming device further has a controller that starts modulating the light beam with image data when the time period has elapsed after the reference mark detecting unit detects the reference mark.

The present invention provides a scanning unit that scans a photosensitive member. The scanning unit has a light-emitting unit that emits a light beam: a polygon mirror having a plurality of facets, each of the plurality of facets deflects the light beam to the photosensitive member; a driving unit that rotates the polygon mirror; a reference mark that revolves together with the polygon mirror, the reference mark indicating a reference position of the polygon mirror; a reference mark detecting unit that detects the reference mark; and a memory unit that saves a length of a time period from a first time to a second time for one of the plurality of facets when the polygon mirror is rotating. The first time is when the reference mark detecting unit detects the reference mark. The second time is when the light beam deflected by the one of the plurality of facets arrives at the photosensitive member.

The present invention provides a measuring device that measures a scanning unit, the scanning unit having a light-emitting unit that emits a light beam, a polygon mirror that deflects the light beam, a driving unit that rotates the polygon mirror, a reference mark that revolves together with the polygon mirror and indicates a reference position of the polygon mirror, a reference mark detecting unit that detects the reference mark, and a window that pass through the light beam deflected by the polygon mirror. The measuring device has a scanning unit mounting section that receives the scanning unit; a light beam receiving unit that receives the light beam passing through the window; a calculating unit that calculates a length of a time period from a first time to a second time. The first time is when the reference mark detecting unit detects the reference mark while the polygon mirror is rotating at a constant speed. The second time is when the light beam receiving unit receives the light beam, The present invention provides a measuring system having: a measuring device that measures a scanning unit, the scanning unit having a light-emitting unit that emits a light beam, a polygon mirror that deflects the light beam, a driving unit that rotates the polygon mirror, a reference mark that revolves together with the polygon mirror and indicates a reference position of the polygon mirror, a reference mark detecting unit that detects the reference mark, a window that pass through the light beam deflected by the polygon mirror, and a controller having a memory unit. The measuring device further includes: a scanning unit mounting section that receives the scanning unit; a light beam receiving unit that receives the light beam passing through the window; a calculating unit that calculates a length of a time period from a first time to a second time. The first time is when the reference mark detecting unit detects the reference mark while the polygon mirror is rotating at a constant speed. The second time is when the light beam receiving unit receives the light beam. The measuring device has a transmitter that transmits the length of the time period calculated by the calculating unit to an external device. The controller saves the length of the time period transmitted by the transmitter to the memory unit.

The present invention provides a method for manufacturing a scanning unit. The scanning unit has a light-emitting unit that emits a light beam; a polygon mirror that deflects the light beam; a driving unit that rotates the polygon mirror; a reference mark that revolves together with the polygon mirror; a reference mark detecting unit that detects the reference mark; and a window that pass through the deflected light beam. The method having the step of: measuring a length of a time period from a first time to a second time while the polygon mirror is rotating at a constant speed, the first time being when the reference mark detecting unit detects the reference mark, the second time being when the light beam deflected by the polygon mirror passes through the window.

The present invention provides an image-forming device having: a light emitting unit that emits a light beam; a polygon mirror having a plurality of facets, each of the plurality of facets deflects the light beam; a driving unit that rotates the polygon mirror; a photosensitive member having a photosensitive surface to be scanned with the light beam deflected by the polygon mirror; a reference mark that revolves together with the polygon mirror, the reference mark indicating a reference position of the polygon mirror; a reference mark detecting unit that detects the reference mark; a memory unit that saves a length of a time period from a first time to a second time for each one of the plurality of facets when the polygon mirror is rotating, the first time being when the reference mark detecting unit detects the reference mark, the second time being when the light beam deflected by the one of the plurality of facets arrives at the photosensitive surface of the photosensitive member; and a controller that starts modulating the light beam with image data when the time period has elapsed after the reference mark detecting unit detects the reference mark.

The present invention further provides an image-forming device having: a photosensitive member and a scanning unit that scan the photosensitive member with a light beam. The scanning unit has; a light emitting unit that emits the light beam; a polygon mirror having a plurality of facets, each of the plurality of facets deflects the light beam to the photosensitive member; a driving unit that rotates the polygon mirror; at least two reference marks that revolve together with the polygon mirror, each of the at least two reference marks indicating a reference position of the polygon mirror; a reference mark detecting unit that detects each of the at least two reference marks; and a memory unit that saves a length of a time period from a first time to a second time for one of the plurality of facets when the polygon mirror is rotating, the first time being when the reference mark detecting unit detects one of the at least two reference marks, the second time being when the light beam deflected by the one of the plurality of facets arrives at the photosensitive member; and a controller that starts modulating the light beam with image data when the time period has elapsed after the reference mark detecting unit detects the one of the at least two reference marks.

BRIEF DESCRIPTION OF THE DRAWINGS

The above and other objects, features, and advantages of the invention will become more apparent from reading the following description of the preferred embodiments taken in connection with the accompanying drawings in which:

FIG. 10 is a block diagram showing the structure of a laser printer controlling unit according to the second embodiment;

DESCRIPTION OF THE PREFERRED EMBODIMENTS

Next, preferred embodiments of the present invention will be described while referring to the accompanying drawings. First, the general structure of a laser printer according to a first embodiment will be described with reference to FIG. 1.

Figure 1:
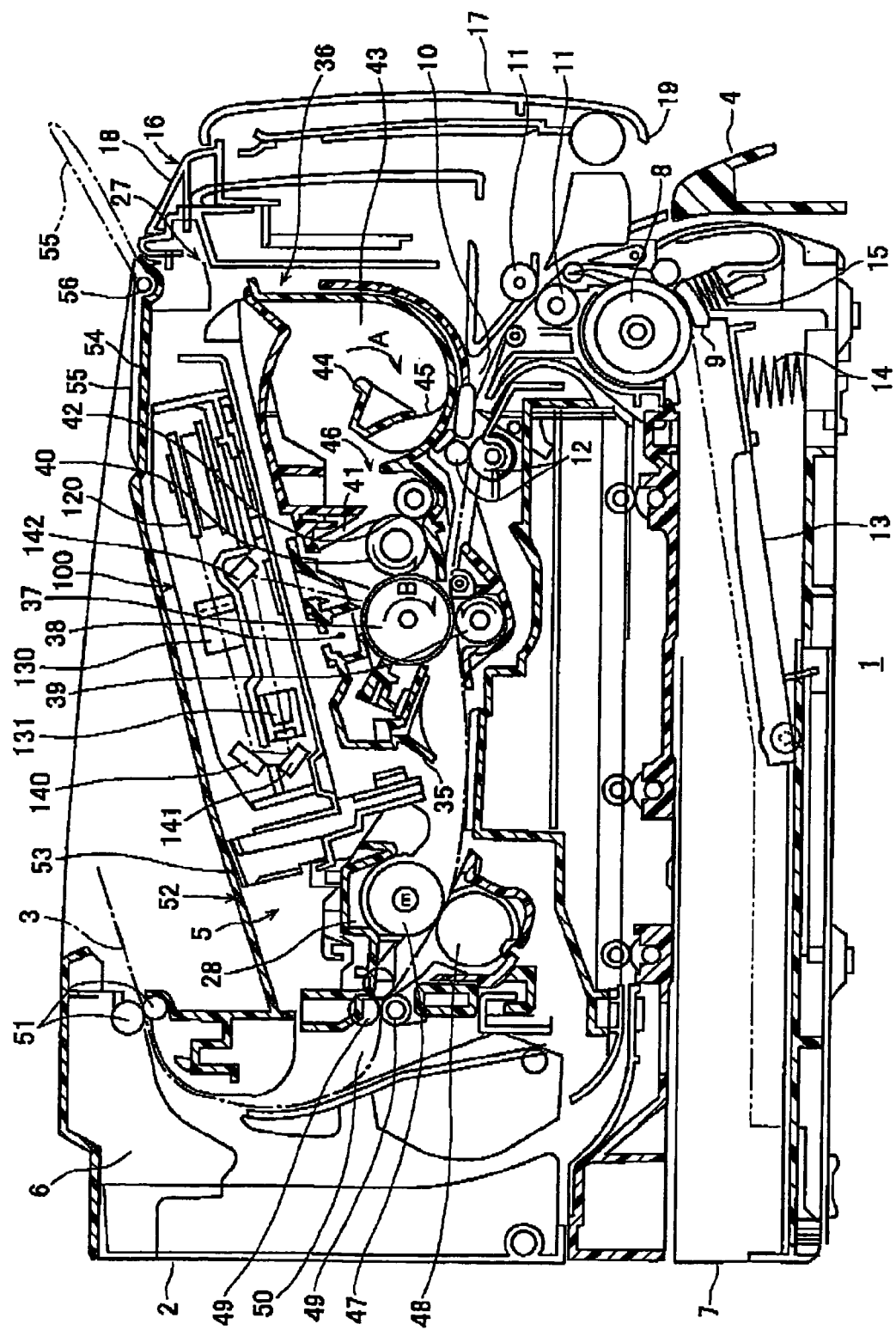
FIG. 1 is a side cross-sectional view showing the general construction of a laser printer according to a first embodiment of the present invention.

As shown in FIG. 1, a laser printer 1 has a main frame 2 formed of a synthetic resin. Within the main frame 2 are provided a paper supply unit 4 for supplying sheets 3 of a paper, an image-forming unit 5 for forming images on the sheets 3 supplied from the paper supply unit 4, and a discharge unit 6 for discharging the sheets 3 after an image has been formed thereon. In the following description, the side of the laser printer 1 in which a feeding roller 8 described later is provided will be referred to as the "front side," while the side in which a fixing unit 28 described later is provided will be referred to as the "rear side."

The paper supply unit 4 includes a paper cassette 7, a feeding roller 8 and separating pad 9 disposed above the front end of the paper cassette 7 (the side above the leading edge of the sheets 3 in the paper conveying direction), a paper supply path 10 for reversing the direction of the sheets 3 of paper fed from the feeding roller 8 and conveying the sheets 3 toward the rear side of the laser printer 1, and paper dust rollers 11 and registration rollers 12 disposed along the paper supply path 10.

The paper cassette 7 is formed in a box shape that is open on the top and is detachably mounted in a bottom section of the main frame 2 through the front side of the main frame 2. A paper pressing plate 13 and a spring 14 are disposed inside the paper cassette 7.

The paper pressing plate 13 is pivotably supported on the end farthest from the feeding roller 8, enabling the end nearest the feeding roller 8 to move vertically. The spring 14 is disposed on the underside of the paper pressing plate 13, urging the end of the paper pressing plate 13 nearest the feeding roller 8 upward. As the number of sheets 3 stacked on the paper pressing plate 13 increases, the paper pressing plate 13 opposes the urging force of the spring 14 and pivots downward about the end farthest from the feeding roller 8.

The feeding roller 8 and separating pad 9 are disposed in confrontation with each other. A spring 15 disposed on the underside of the separating pad 9 presses the separating pad 9 toward the feeding roller 8. The spring 14 on the underside of the paper pressing plate 13 pushes the stack of sheets 3 on the paper pressing plate 13 toward the feeding roller 8 so that the topmost sheet 3 becomes interposed between the feeding roller 8 and separating pad 9. The sheets 3 are separated one sheet at a time between the feeding roller 8 and separating pad 9 and conveyed toward the paper supply path 10 by the rotation of the feeding roller 8.

The pair of paper dust rollers 11 disposed above the feeding roller 8 along the paper supply path 10 remove paper dust from the sheet 3 supplied by the feeding roller 8 and convey the sheet 3 to the registration rollers 12. The pair of registration rollers 12 registers the sheet 3 and then conveys the sheet 3 to an image formation position (the point of contact between a photosensitive drum 37 and a transfer roller 39 described later).

A front cover 16 is disposed on the front of the laser printer 1 opposing the front surface of the main frame 2. The front cover 16 is substantially rectangular in shape when viewed from the front, but is formed in the shape of a shallow box that opens on the side confronting the front surface of the main frame 2. The front cover 16 includes a front wall 17, a top wall 18 that is a protruding part on a receiving surface described later, a bottom wall 19, and two side walls (not shown), all of which are formed integrally. The front cover 16 is pivotably supported on the main frame 2 about hinges (not shown) provided on the bottom wall 19. By swinging the top wall 18 in the front-and-rear direction, the front cover 16 can open or close over the main frame 2.

The image-forming unit 5 includes a scanning unit 100, a process unit 27, and a fixing unit 28. The scanning unit 100 is disposed in an upper section of the main frame 2 and includes a laser light-emitting unit (not shown in FIG. 1), a polygon mirror 120 that can be driven to rotate, fθ lenses 130 and 131, and reflecting mirrors 140, 141, and 142. A light beam modulated based on image data is emitted from the laser light-emitting unit and sequentially passes through or reflects off of the polygon mirror 120, fθ lens 130, reflecting mirrors 140 and 141, fθ lens 131, and reflecting mirror 142, as indicated by the dotted line. The laser light is irradiated in a high-speed scan over the photosensitive surface of a photosensitive drum 37 provided in the process unit 27.

The process unit 27 is disposed below the scanning unit 100 and includes a drum cartridge 35 detachably mounted in the main frame 2. The drum cartridge 35 accommodates a developer cartridge 36, the photosensitive drum 37, a charger 38, and a transfer roller 39. The drum cartridge 35 can be mounted in or removed from the main frame 2 by opening the front cover 16 provided on the front surface of the main frame 2.

The developer cartridge 36 is detachably mounted on the drum cartridge 35 and includes a developing roller 40, a thickness regulating blade 41, a supply roller 42, and a toner hopper 43 filled with toner. The toner is a polymerized toner obtained by copolymerizing a polymerized monomer using a well-known polymerization method such as suspension polymerization. The polymerized monomer may be, for example, a styrene monomer such as styrene or an acrylic monomer such as acrylic acid, alkyl (C1-C4) acrylate, or alkyl (C1-C4) meta acrylate.

The developer cartridge 36 also includes a rotating shaft 44 disposed in the center of the toner hopper 43, an agitator 45 supported on the rotating shaft 44 and capable of rotating in a direction indicated by an arrow A, and a toner supply opening 46 formed in a side of the toner hopper 43. The rotating agitator 45 stirs toner in the toner hopper 43 and discharges some of the toner through the toner supply opening 46. The supply roller 42 is rotatably disposed next to the toner supply opening 46, while the developing roller 40 is rotatably disposed in confrontation with the supply roller 42. The supply roller 42 and developing roller 40 contact each other and are each compressed to some extent by the contact. The supply roller 42 is configured of a metal roller shaft covered by a roller formed of an electrically conductive sponge material. The supply roller 42 rotates clockwise in FIG. 1.

The developing roller 40 is configured of a metal roller shaft covered with an electrically conductive rubber material. The developing roller 40 rotates counterclockwise in FIG. 1, as indicated by the arrow. A developing bias is applied to the developing roller 40. The thickness regulating blade 41 is disposed near the developing roller 40. The thickness regulating blade 41 includes a main blade member configured of a metal leaf spring, and a pressing member provided on the end of the main blade member. The pressing member has a semicircular cross section and is formed of an insulating silicon rubber. The thickness regulating blade 41 is supported on the developer cartridge 36 near the developing roller 40 so that the elastic force of the main blade member causes the pressing member to contact the developing roller 40 with pressure.

Toner discharged through the toner supply opening 46 is supplied to the developing roller 40 by the rotation of the supply roller 42. At this time, the toner is positively tribocharged between the supply roller 42 and the developing roller 40. As the developing roller 40 rotates, the toner supplied to the surface of the developing roller 40 passes between the thickness regulating blade 41 and the developing roller 40, thereby maintaining a uniform thickness of toner on the surface of the developing roller 40.

The photosensitive drum 37 is disposed to the side of the developing roller 40 and can rotate in the drum cartridge 35 in the direction B (clockwise in FIG. 1) while in confrontation with the developing roller 40. The photosensitive drum 37 has a main drum body that is grounded and a photosensitive surface formed of a positively charged photosensitive material of polycarbonate.

The charger 38 is disposed above the photosensitive drum 37, confronting the photosensitive drum 37 but separated a prescribed distance therefrom. The charger 38 is a positive charging Scorotron charger having a charging wire formed of tungsten from which a corona discharge is generated. The charger 38 functions to charge the entire surface of the photosensitive drum 37 with a uniform positive polarity.

The transfer roller 39 is disposed below the photosensitive drum 37 and in opposition thereto, and is supported in the drum cartridge 35 so as to be capable of rotating in the direction indicated by the arrow (counterclockwise in FIG. 1). The transfer roller 39 includes a metal roller shaft covered by a roller that is formed of an electrically conductive rubber material. A transfer bias is applied to the transfer roller 39 during a transfer operation.

As the photosensitive drum 37 rotates, the charger 38 charges the surface of the photosensitive drum 37 with a uniform positive polarity. Subsequently, the surface of the photosensitive drum 37 is exposed to a laser beam emitted from the scanning unit 100, forming a latent image on the surface of the photosensitive drum 37. Next, the positively charged toner carried on the surface of the developing roller 40 is brought into contact with the photosensitive drum 37 as the developing roller 40 rotates. At this time, due to the developing bias applied to the developing roller 40, the latent images formed on the surface of the photosensitive drum 37 are developed into toner images when the toner is selectively attracted to portions of the photosensitive drum 37 that were exposed to the laser beam and, therefore, have a lower potential than the rest of the surface having a uniform positive charge. In this way, a reverse developing process is achieved.

Subsequently, the toner image carried on the surface of the photosensitive drum 37 is transferred onto a sheet 3 due to the transfer bias applied to the transfer roller 39, as the sheet 3 passes between the photosensitive drum 37 and the transfer roller 39.

The fixing unit 28 is disposed to the side and downstream of the process unit 27 with respect to the paper conveying direction. The fixing unit 28 includes a heating roller 47, a pressure roller 48 that contacts the heating roller 47 with pressure, and a pair of conveying rollers 49 disposed downstream of the heating roller 47 and pressure roller 48.

The heating roller 47 is configured of a metal cylinder accommodating a heater in the form of a halogen lamp that functions to heat the metal tube. The pressure roller 48 follows the rotation of the heating roller 47 while applying pressure to the same.

After the toner image is transferred onto the sheet 3 in the process unit 27, the toner is fixed to the sheet 3 in the fixing unit 28 by the heat of the heating roller 47 as the sheet 3 passes between the heating roller 47 and the pressure roller 48. Subsequently, the conveying rollers 49 convey the sheet 3 along a discharge path 50 in the discharge unit 6.

The discharge unit 6 includes the discharge path 50, a pair of discharge rollers 51, and a discharge tray 52. The discharge path 50 extends upward from the conveying rollers 49 to the discharge rollers 51 disposed above the conveying rollers 49.

The discharge tray 52 is substantially rectangular in shape in a plan view. The rear end of the discharge tray 52 is disposed between the conveying rollers 49 and the discharge rollers 51. The discharge tray 52 is formed with a slanted plate portion 53 that slants upward from the rear toward the front, and a flat plate portion 54 that is formed integrally with the slanted plate portion 53 and extends forward in a substantially horizontal direction from the front end of the slanted plate portion 53. The front end of the flat plate portion 54 confronts a free end of the top wall 18 provided on the front cover 16.

A stopper 55 is provided on the flat plate portion 54 for stopping the discharged sheets 3. Specifically, a recessed area substantially rectangular in shape in a plan view is formed approximately in the widthwise center of the flat plate portion 54. The stopper 55 is embedded in the recessed area. The stopper 55 is also substantially rectangular in shape in a plan view. The stopper 55 is pivotably supported on the flat plate portion 54 via a hinge 56 disposed on the front end of the stopper 55. As shown in phantom in FIG. 1, the stopper 55 is configured to open and close over the flat plate portion 54 by pivoting the rear end of the stopper 55 forward and backward about the hinge 56 provided on the front end thereof. When deployed (the state showed in phantom in FIG. 1), the stopper 55 angles upward toward the front at a gradient steeper than that of the slanted plate portion 53, thereby preventing the discharged sheets 3 from falling off the front end of the discharge tray 52.

Hence, the conveying rollers 49 convey the sheets 3 along the discharge path 50 to the discharge rollers 51, and the discharge rollers 51 discharge the sheets 3 onto the discharge tray 52 from the rear side toward the front side of the main frame 2. Although not shown in FIG. 1, a main circuit board having a controller that controls the components of the laser printer is disposed on the inner left side surface of the main frame 2 near the rear side.

Figure 2:
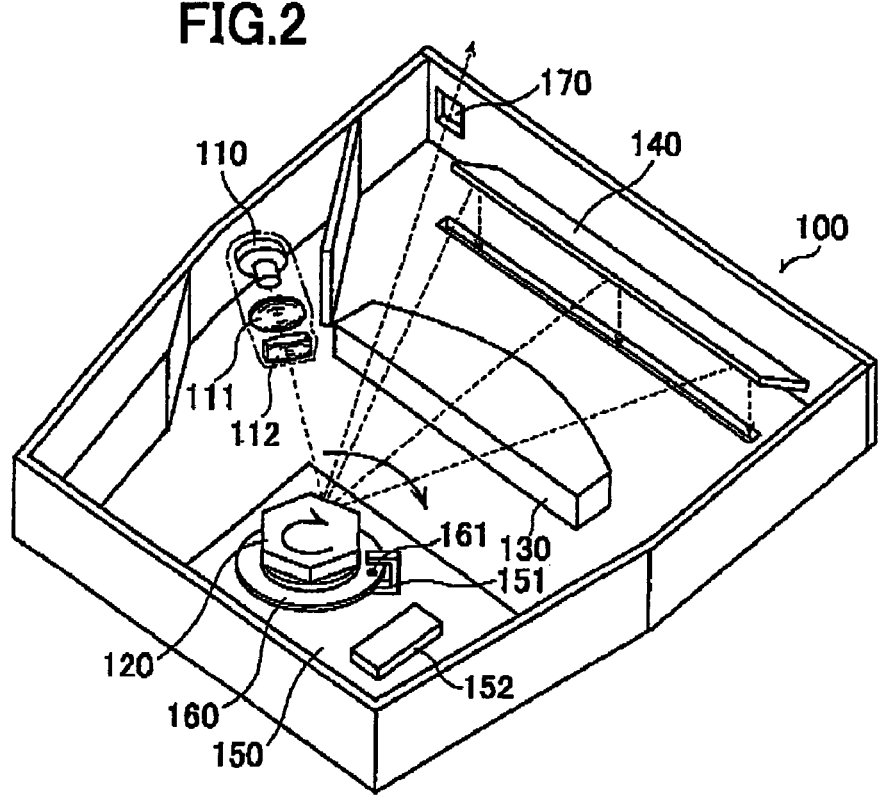
FIG. 2 is a perspective view showing the structure of a scanning unit employed in the laser printer.

Next, the structure of the scanning unit 100 will be described with reference to FIG. 2. The scanning unit 100 is configured of a laser diode 110, a collimator lens 111, a cylindrical lens 112, the polygon mirror 120, the fθ lens 130, and the reflecting mirror 140 in a casing. The laser diode 110, collimator lens 111, and cylindrical lens 112 are aligned on an optical path and all accommodated in a metal holder shown in phantom in FIG. 2.

The laser diode 110 emits a light beam for scanning and exposing the photosensitive drum 37. The light beam emitted from the laser diode 110 passes through the collimator lens 111 and cylindrical lens 112 to strike the polygon mirror 120.

The polygon mirror 120 has an equilateral polygonal shape having a plurality of facets. The polygon mirror 120 is driven by a drive motor (not shown) to rotate at a high speed in the direction indicated by the arrow. The polygon mirror 120 is rotated to deflect the laser beam to achieve conformal motion, while the lenses fθ lenses 130 and 131 (see FIG. 1) ensure that the laser beam moves at a constant speed in a main scanning direction across the photosensitive drum 37. That is, the rotating one facet causes the laser beam to scan and expose one data line in a main scanning direction across a photosensitive area of the photosensitive drum 37, as the polygon mirror 120 is rotating. Thus, the polygon mirror 120 scans a line from the scan starting point to the scan end point on the photosensitive drum 37 with each facet.

The polygon mirror 120 is provided with a transparent disc 160, a reference mark 161 formed on the transparent disc 160, and a photointerrupter 151. The transparent disc 160 is integral with the polygon mirror 120 to rotate together and concentrically with the same. The reference mark 161 is formed at a proper position on the disc 160 for defining a reference position of the polygon mirror 120. The photointerrupter 151 is provided near the polygon mirror 120 and has a pair of light transmitting and receiving elements to interpose the transparent disc 160. The photointerrupter 151 detects the reference mark 161 passing between the light transmitting and receiving elements.

In this embodiment, the polygon mirror 120 has six facets. The drive motor is a three-phase, brushless DC motor.

A motor driver circuit 152 is provided in the scanning unit 100 for controlling the polygon mirror drive motor. The motor driver circuit 152 generates a locking signal when the polygon mirror 120 comes to rotate at a predetermined constant rate. In FIG. 2, the polygon mirror 120, polygon mirror drive motor, and motor driver 152 are mounted on a polygon mirror circuit board 150.

The reflecting mirror 140 reflects the laser beam to the reflecting mirror 141 (see FIG. 1). Further, a beam passage window 170 is formed in a wall of the casing to allow the passage of a laser beam reflected off the polygon mirror 120, as will be described below.

When the scanning unit 100 is installed in the laser printer 1 to control image forming processes, the data indicating the length of the time period from the detection of the reference mark 161 until the arrival of the laser beam at the scan starting point on the photosensitive drum 37 (hereinafter referred to as "timing data") is required for the laser beam to scan on the photosensitive drum 37. It is noted that the scan starting point on the photosensitive drum 37 is the point one from which the laser beam started being modulated by image data to be printed.

Figure 3:
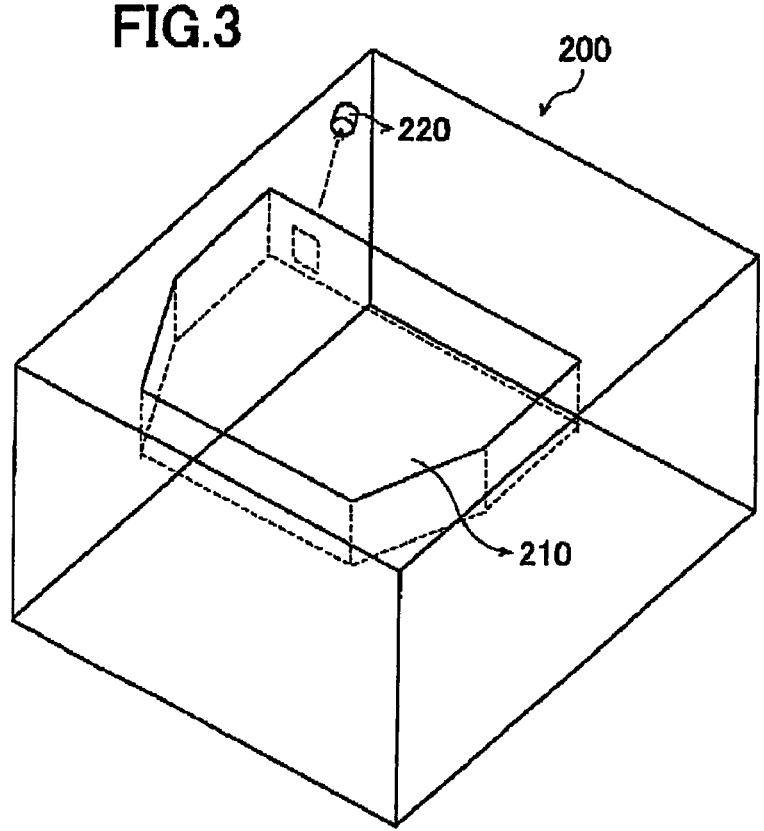
FIG. 3 is a perspective view showing the general structure of a measuring device used for generating timing data.

FIG. 3 is a perspective view showing a scanning unit measuring device 200 (hereinafter abbreviated to a "measuring device 200") used for obtaining the timing data. This measuring device 200 can be incorporated in an inspection device used to inspect basic properties of the scanning unit (imaging status of the laser beam, and rotating status of the motor) prior to installation to the laser printer 1.

As shown in FIG. 3, the measuring device 200 includes an loading section 210 for loading the scanning unit 100, and a beam detection sensor (hereinafter referred to as "sensor") 220 for detecting a laser beam passing through the beam passage window 170 when the scanning unit 100 is loaded in the measuring device 200. The sensor 220 is disposed in a position substantially equivalent to the position at which a conventional BD sensor is supposed to be located in a conventional image-forming device. Specifically, the sensor 220 is positioned so that the distance from a reflecting surface of the polygon mirror 120 to the sensor 220 is substantially equivalent to the distance from the reflecting surface to the surface of the photosensitive drum 37.

Figure 4:
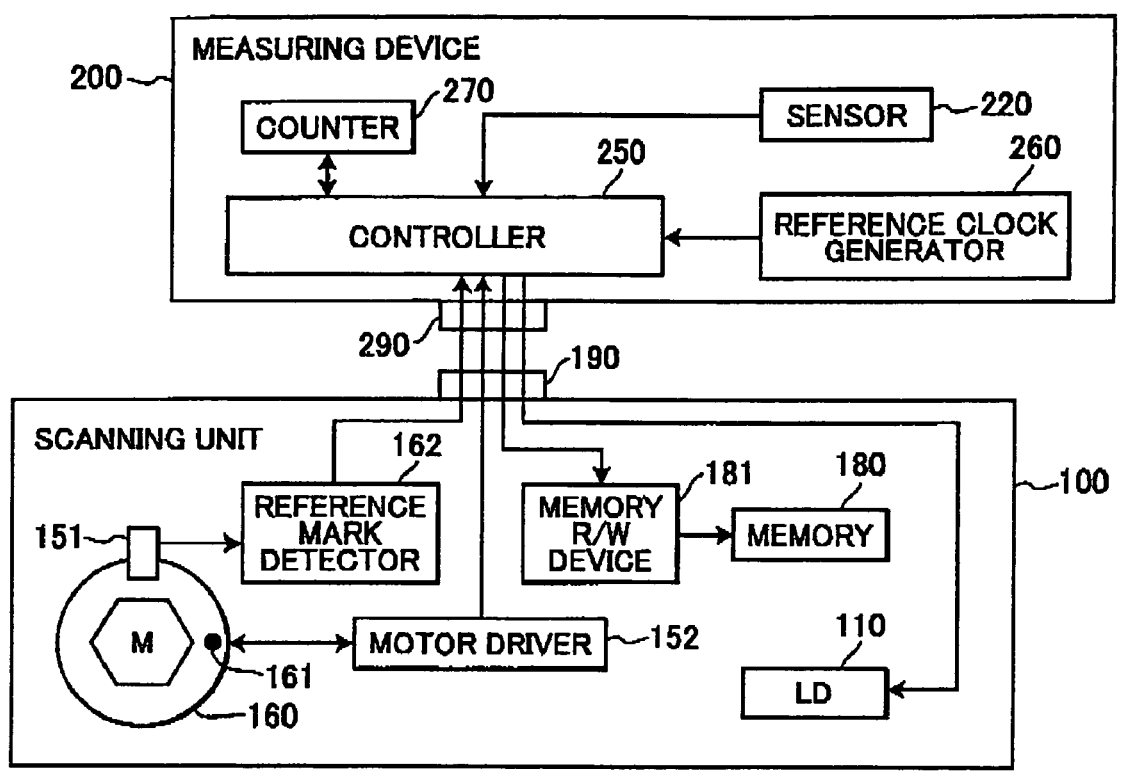
FIG. 4 is a block diagram showing components in the scanning unit and measuring device.

Next, the process of acquiring timing data will be described in detail. FIG. 4 is a block diagram illustrating components in the scanning unit 100 and measuring device 200. As shown in FIG. 4, the scanning unit 100 further includes a reference mark detecting unit 162, a memory device 180, a memory read/write unit 181, and a connector 190. The reference mark detecting unit 162, memory device 180, and memory read/write unit 181 may be physically mounted on the same LSI chip as the motor driver 152, or may be configured on separate ICs or LSIs.

The reference mark detecting unit 162 is connected to the photointerrupter 151 to detect the reference mark 161 through the photointerrupter 151. The memory device 180 saves the timing data. The memory device 180 is preferably a writable, nonvolatile memory, such as EEPROM and Flash ROM. The a memory read/write unit 181 is used to write and read the timing data from the memory device 180. The memory read/write unit 181 functions to save and read data with respect to the memory 180. The connector 190 is connectable with the measuring device 200. In another embodiment, a volatile memory may be used as the memory device 180.

The measuring device 200 includes a controller 250, a reference clock generator 260, and a counter 270, in addition to the sensor 220 described above. The controller 250 includes a CPU (not shown) for calculating the timing data. The reference clock generator 260 generates a reference clock. The counter 270 counts the reference clock generated by the reference clock generator 260.

In this embodiment, the counter 270 counts the number of reference clock generated by the reference clock generator 260 from a timing in which the reference mark 161 is detected until the sensor 220 then detects the laser beam. The controller 250 generates the timing data based on the number of reference clock.

Signals transferred from the scanning unit 100 to the measuring device 200 include a signal transferred from the reference mark detecting unit 162 indicating that the photointerrupter 151 has detected the reference mark 161, and the locking signal transferred from the motor driver 152 indicating that the polygon mirror drive motor is rotating at a constant speed. In this embodiment, the scanning unit 100 is connected to the measuring device 200 via the connector 190 and a connector 290 provided on the measuring device 200. However, it should be obvious that the connector 190 is unnecessary if the scanning unit 100 and measuring device 200 are directly wired together.

The next description will be made for explaining the process for generating timing data by the controller 250 in the measuring device 200, referring to FIGS. 5 and 6.

Naturally, in the process to obtain timing data, the drive motor driving the polygon mirror is required to rotate at a constant speed. Accordingly, in S101, the controller 250 determines if the locking signal is generated from the motor driver 152. If the locking signal is generated (S101: YES), then in S102 the controller 250 directs the laser diode 110 to emit light. In S103 the controller 250 determines if the reference mark detecting unit 151 has detected the reference mark 161 through photointerrupter 151. Here, the controller 250 may wait until the reference mark 161 has been detected a plurality of times.

Figure 5:
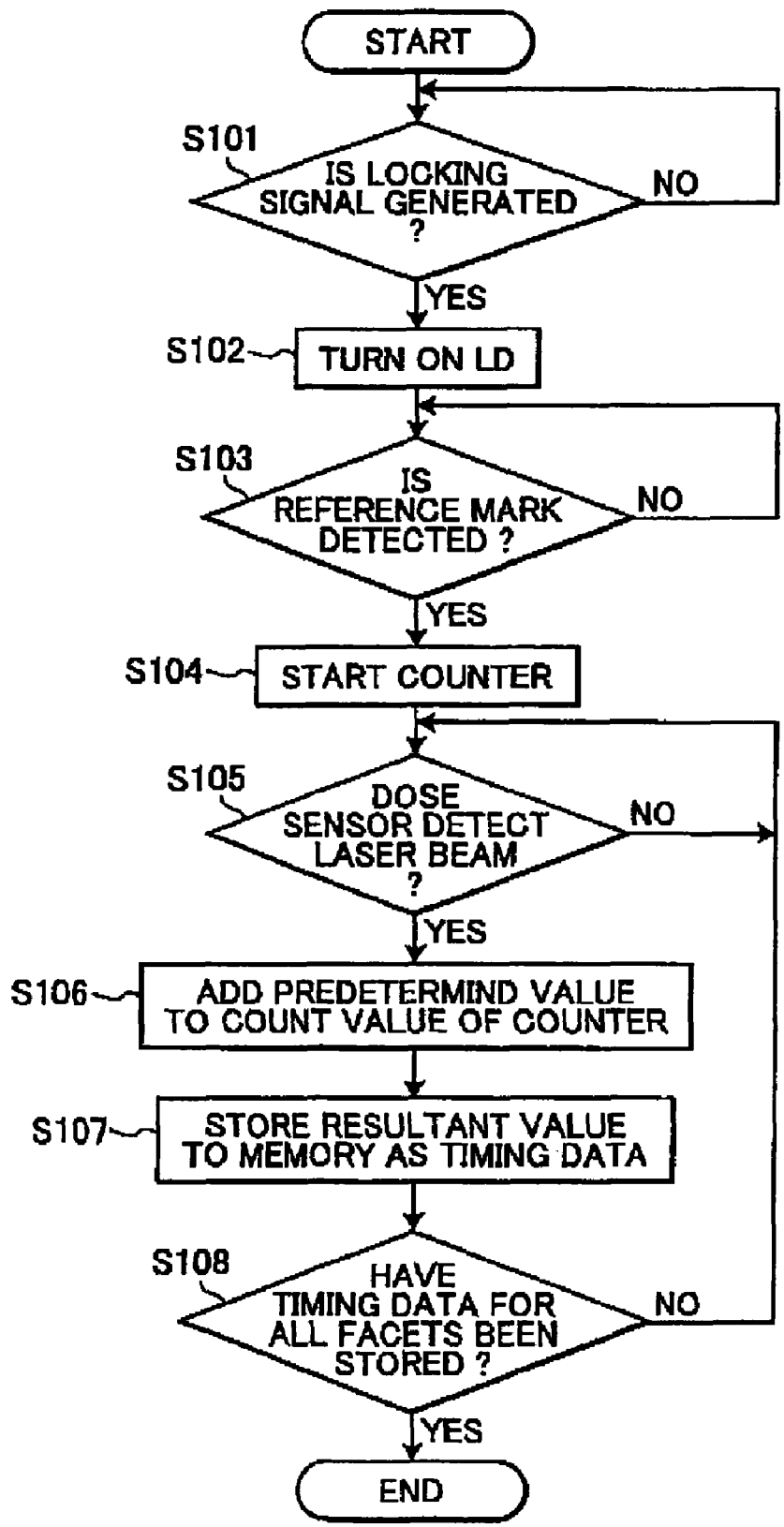
FIG. 5 is a flowchart illustrating steps in a process performed by a controller provided in the measuring device of the first embodiment.
Figure 6:
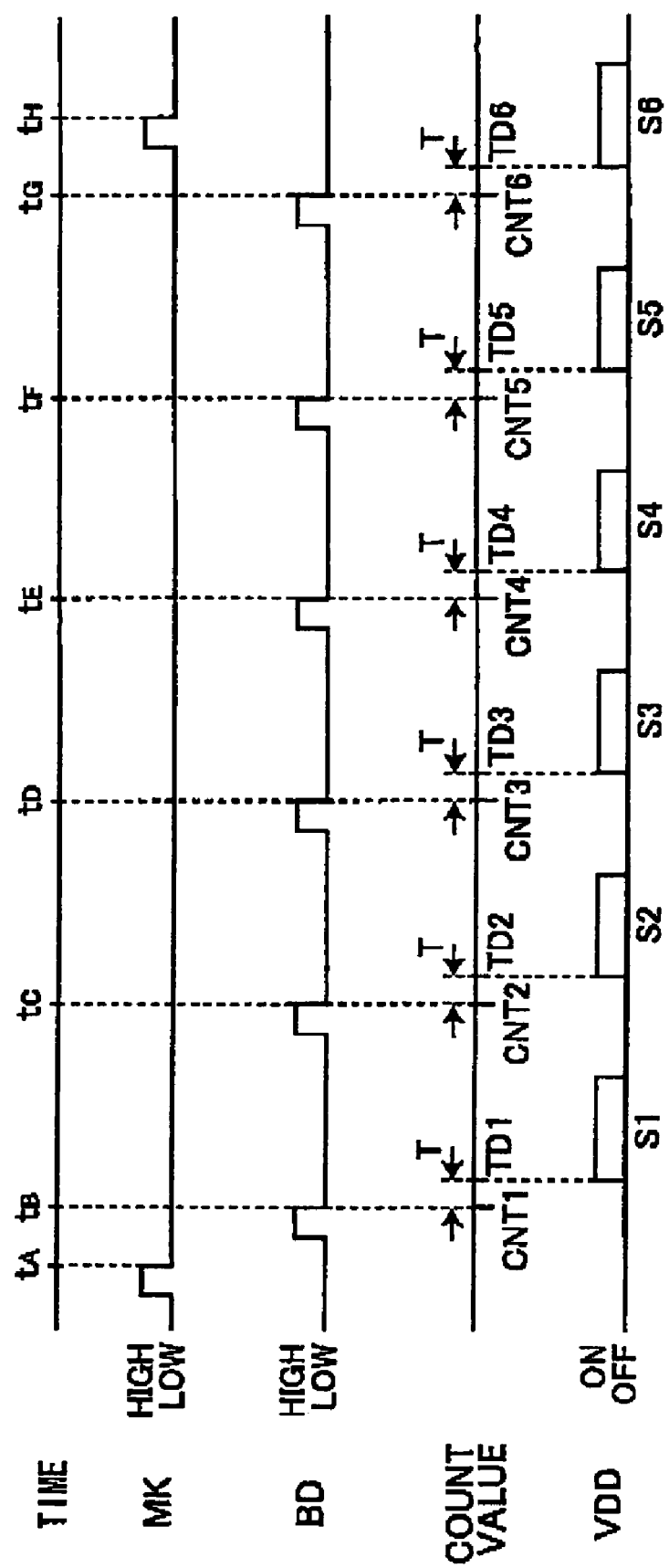
FIG. 6 is a timing chart illustrating count values in the first embodiment.

FIG. 6 shows waveforms of each signal generated in the process of FIG. 5. The "MK" signal indicates that the reference mark detecting unit 162 has detected the reference mark 161 through the photointerrupter 151. When the reference mark detecting unit 162 has detected the reference mark 161 at the time $t_A$ (S103: YES), the MK signal changes from HIGH to LOW, and in S104 the controller 250 instructs the counter 270 to reset and then start counting the reference clock.

In S105 the controller 250 determines that the sensor 220 has detected the laser beam, that is, that the output level from the sensor 220 (indicated by "BD" in FIG. 6) changes from HIGH to LOW. When the sensor 220 detects the laser beam (S105: YES), then in S106 the controller 250 receives the count value (CNT1) of the counter 270 at that moment and adds a predetermined value T to the count value (CNT1), and then saves the resultant value (CNT1+T) as the timing data (TD1) in the memory device 180 in S107. The predetermined value T is the time period required for the laser beam to move from the position corresponding to the sensor 220 to the position at which exposure on the photosensitive drum 37 with the modulated laser beam by image data is started, when the scanning unit 100 is installed in the laser printer 1. The predetermined value T is a constant which is inherent in the laser printer 1.

In this embodiment, both detection of the signal MK of the reference mark and the output timing BD from the sensor 220 are set to the falling edge of a pulsed signal. In another embodiment, the rising edge of the signal may be used as the detection timing for one or both of the MK or BD signals.

Referring to FIG. 6, the sensor 220 detects the laser beam at the time $t_B$ for the first time after the reference mark 161 is detected at the time $t_A$, when the detection signal BD changes from HIGH to LOW. Hence, the count value CNT1 of the counter 270 at the time $t_B$ is add to the predetermined value T. The resultant value CNT1+T is saved in the memory device 180 as the first timing data.

In this embodiment, the polygon mirror 120 has six facets. Since the polygon mirror scans one line on the photosensitive drum 37 with each facet and has the single reference mark 161, six instances of timing data are required to control the exposure timing accurately for each facet of the polygon mirror. As described above, the polygon mirror 120 has one reference mark 161 and six facets, the sensor 220 is required to detect the laser beam six times after the reference mark 161 has been detected at the time $t_A$ and until the reference mark 161 is detected again at the time $t_H$.

Referring to FIG. 5 again, in S108, the controller 250 determines whether all instances of timing data TD1-TD6 have been acquired for all facets of the polygon mirror. In this embodiment, the controller 250 determines whether timing data has been acquired for all six facets of the polygon mirror. If timing data has not been acquired for all facets yet (S108: NO), then the controller 250 returns to S105 and waits for that the sensor 220 detects the laser beam again. By repeating these steps 105-108, count values CNT2 through CNT6 are sequentially obtained by the controller 250. Based on the count values CNT2 through CNT6, the timing data TD2 through TD6 is saved in the memory device 180. When timing data TD1-TD6 has been saved for all facets of the polygon mirror (S108: YES), then the process for producing timing data ends.

Figure 7:
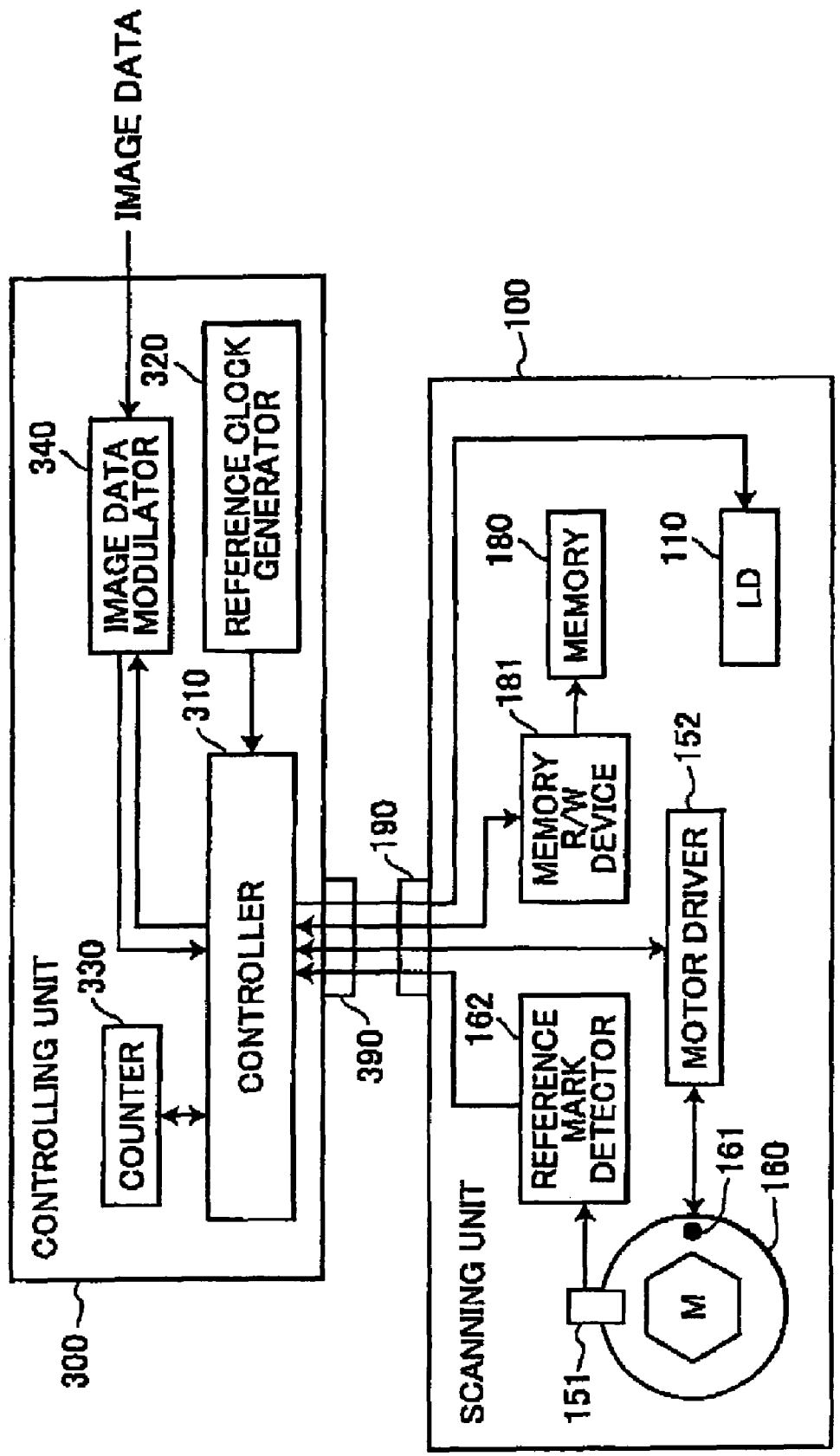
FIG. 7 is a block diagram showing components in the scanning unit and a controlling unit of the laser printer.

Next, a process for performing actual image formation using the timing data will be described with reference to FIGS. 7 and 8. FIG. 7 is a block diagram illustrating a controlling unit 300 of a laser printer equipped with the scanning unit 100. The controlling unit 300 includes a controller 310, a reference clock generator 320, a counter 330, an image data modulator 340, and a connector 390.

The controller 310 controls an image formation process. The reference clock generator 320 generates a reference clock. The frequency of the reference clock 320 is identical to that in the measuring device 200. The counter 330 counts the reference clock generated by the reference clock generator 320. The image data modulator 340 generates signal to modulate the laser beam based on image data representing the content of an image to be formed. The connector 390 connects the scanning unit 100 and the controlling unit 300 of the laser printer 1 in conjunction with the connector 190.

In the image formation process, the controller 310 controls the laser diode 110 to emit and modulate the laser beam according to the image data. In other words, the controller 310 controls the exposure start-timing at which the modulated laser beam by the image data scans and exposes the photosensitive surface of the photosensitive drum 37.

Figure 8:
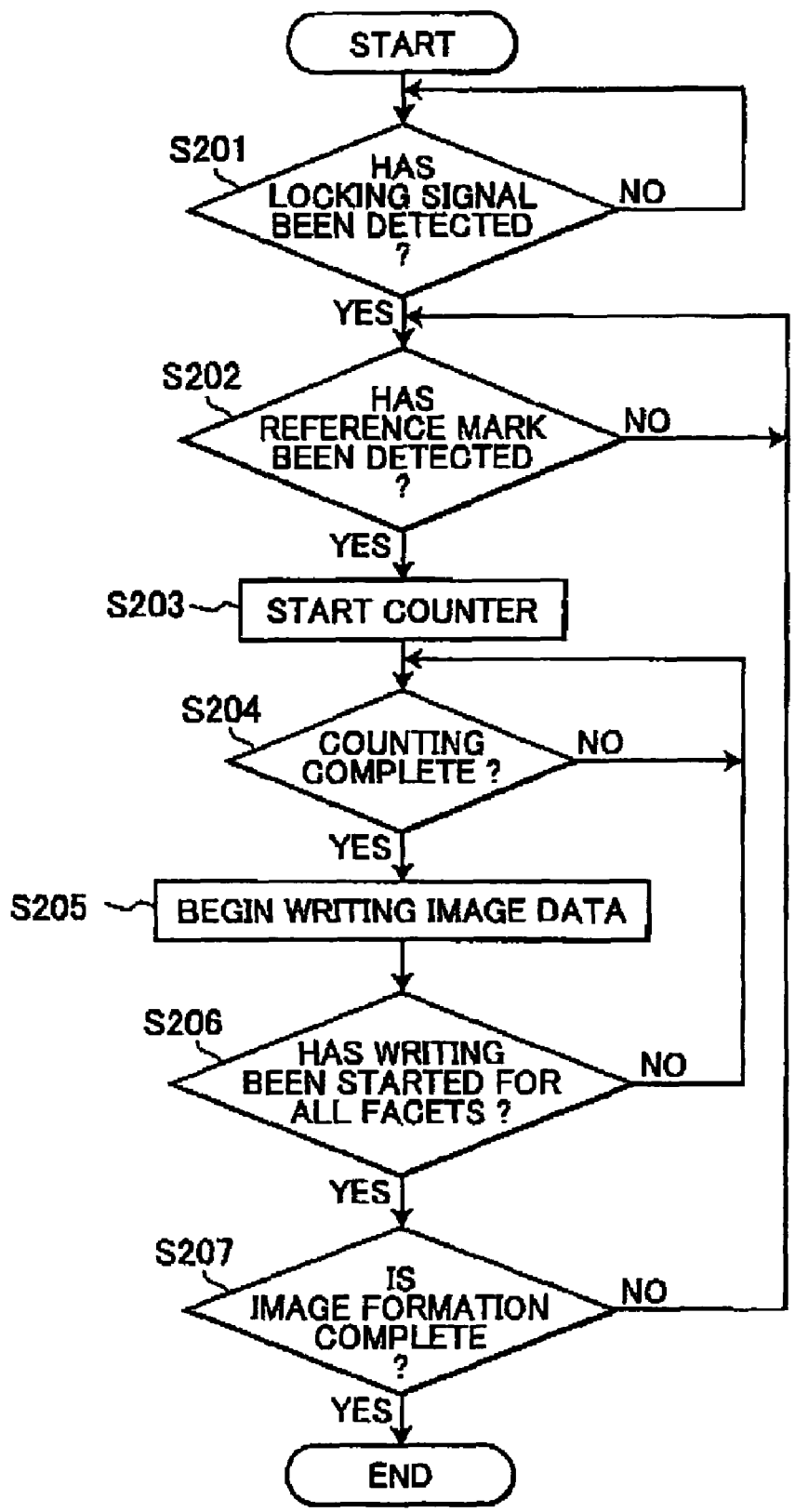
FIG. 8 is a flowchart illustrating steps in the process of a controller provided in the laser printer controlling unit.

FIG. 8 is a flowchart showing steps in the process executed by a controller 310 in the controlling unit 300 for performing image formation. The process shown in the flowchart of FIG. 8 will be described in detail while referring to FIG. 5.

In the image forming process shown in FIG. 8, the controlling unit 310 reads the timing data from the memory device 180 through the memory read/write unit 181.

In S201, the controller 310 determines if the motor driver 152 generates a locking signal regarding the drive motor for the polygon mirror. When a locking signal has been generated (S201: YES), in S202 the controller 310 determines whether the reference mark detecting unit 162 has detected the reference mark 161. When the reference mark detecting unit 162 has detected the reference mark 161 (S202: YES), in S203 the controller 310 starts the counter 330.

In S204 the controller 310 waits for the counter 330 to complete counting the value corresponding to the timing data TD1 read from the memory device 180. The moment the counter 330 has completed counting (S204: YES), in S205 the controller 310 starts the exposure of a laser beam modulated by the image data on the photosensitive drum 37. In FIG. 6, the exposure over photosensitive drum 37 by the modulated laser beam according to the image data is indicated by an ON state of a VDO signal. The VDO signal represents a line of image data to be scanned over the photosensitive drum 37 with the modulated laser beam.

Hereafter, the count values corresponding to the timing data TD2 through TD6 are sequentially counted. Every time the counts sequentially reaches one of the count values corresponding to the timing data TD2 through TD6, the exposure with the image data is started over the photosensitive drum 37, as indicated when the VDO signal turns ON (S2-S6). In S206 the controller 310 determines whether six facets of the polygon mirror 120 are used for the exposure of image data by the modulated laser beam. If the exposure of image data has been started for the last, i.e., sixth facet on the polygon mirror 120 (S206: YES), then in S207 the controller 310 determines whether the image forming process has completed. If the image formation has completed (S207: YES), then the controller 310 ends the image forming process. However, if the image forming process is not complete (S207: NO), then the controller 310 returns to S202 and repeats the same process, determining whether the reference mark 161 is detected again.

As described above, since the timing at which the counter 330 finishes counting each of the count values is equivalent to a timing As described above, the scanning unit 100 acquires timing data for individual facet of a polygon mirror 120 indicating the length of time from the timing that the reference mark is detected until scanning with the modulated light beam begins. Since the timing data has been predetermined for individual facet of the polygon mirror 120, this data accounts for offset of the reference mark position and manufacturing errors in the polygon mirror. Accordingly, the timing to start the exposure over the photosensitive drum 37 by a modulated laser beam by image data can be controlled accurately.

The reference 161 mark may be provided on the polygon mirror or on a mirror rotating together with the polygon mirror. Here, the "reference mark" is not limited to an opaque "mark" provided on a transparent disc, but may, for example, be a transparent part on an opaque disc, an area of a member rotating together with the polygon mirror having a different reflectance or transmittance, or a hole formed in the member. The reference mark is also not limited to a circular shape, but may be another shape, such as a line having a width sufficient for detection. In other words, the reference mark can have any shape or form that enables a prescribed reference position to be detected. The sensor 220 may be any reflecting type or transmitting type sensor that optically detects a reference mark, such as a photointerrupter. Here, the detection can be based on the rising edge or the falling edge of the detection signal outputted from the sensor.

In the first embodiment described above, the nonvolatile memory device 180 is provided in the scanning unit 100 for storing timing data. Since timing data is generated as optimal values to be used with an individual scanning unit, it is desirable to provide memory in the scanning unit for saving this timing data. However, a nonvolatile memory such as EEPROM can drive up the manufacturing costs of the scanning unit. Therefore, in a second embodiment of the present invention, timing data is stored in a data processing device of a server provided external to the image-forming device.

Figure 9:
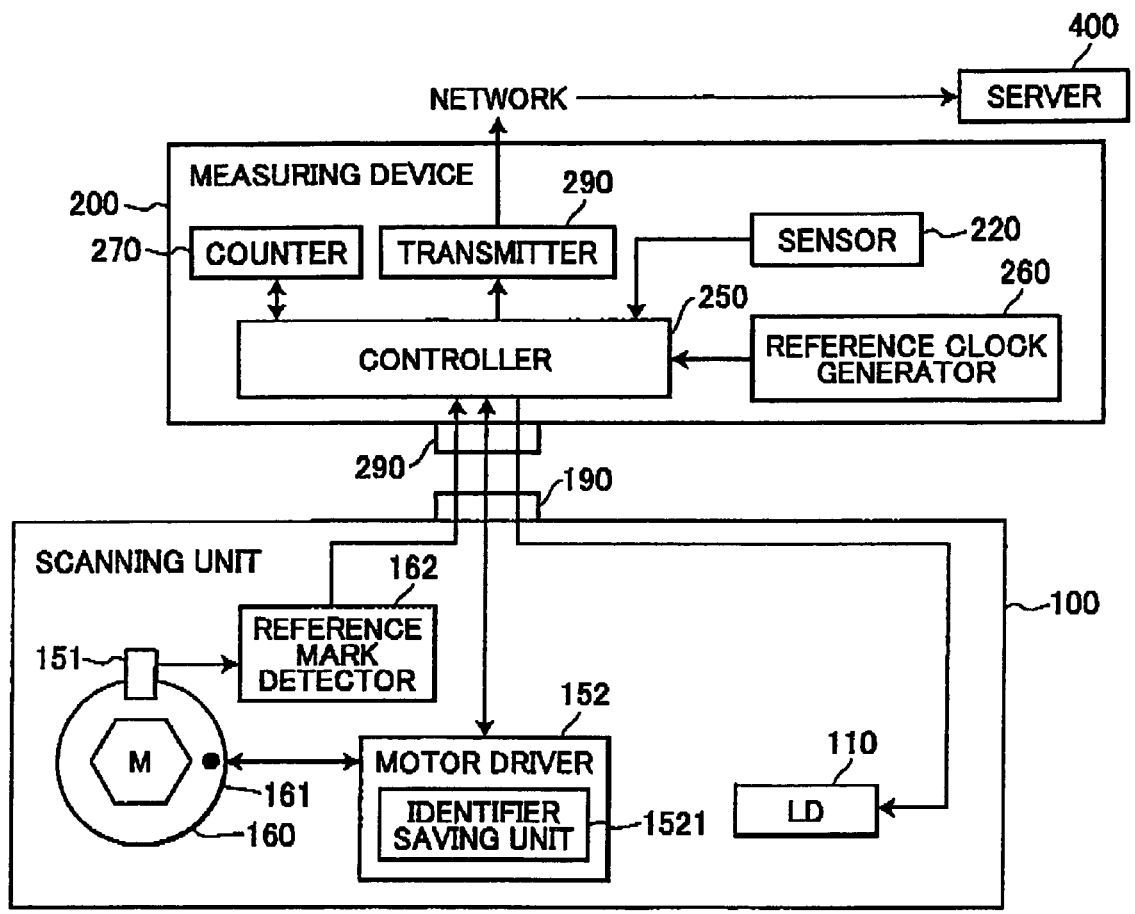
FIG. 9 is a block diagram showing the structure of a scanning unit and manufacturing device according to a second embodiment.

FIG. 9 is a block diagram showing the construction of the scanning unit 100 and measuring device 200 according to the second embodiment. Unlike the scanning unit 100 and measuring device 200 of the first embodiment shown in FIG. 4, the measuring device 200 of the second embodiment is provided with a transmitter 280 for transmitting timing data to a server 400 via a network. In addition, the scanning unit 100 of the second embodiment is not equipped with the memory device 180 and memory read/write unit 181 of the first embodiment, but includes an identifier saving unit 1521 provided in the motor driver 152 for storing identifiers identifying individual scanning units. The transmitter 280 can be configured of a network interface card, for example.

FIG. 10 is a block diagram showing the construction of the controlling unit 300 according to the second embodiment. Unlike the controlling unit 300 of the first embodiment shown in FIG. 7, the controlling unit 300 of the second embodiment is provided with a transceiver 350 for acquiring timing data from the server 400 via a network. The transceiver 350 may also be configured of a network interface card, for example.

When timing data is generated in the second embodiment, rather than storing counter values in memory on the scanning unit 100 as described in S107 of FIG. 5, the transmitter 280 transmits the counter values to the server 400 together with an identifier for the scanning unit that has been saved in the identifier saving unit 1521. Once the scanning unit is mounted in an image-forming device, timing data generated for this specific scanning unit can be acquired from the server 400 by transferring the identifier for the scanning unit to the server 400. Once the timing data has been saved on the laser printer, exposure timing can be controlled according to the same process described in FIG. 8.

Next, a third embodiment of the present invention will be described. In the first embodiment described above, only one reference mark is provided for identifying a reference position of the polygon mirror. In the third embodiment, a plurality of reference marks is provided. With consideration for rotational irregularities in the drive motor for the polygon mirror, it may be desirable to begin writing image data as soon as possible after the reference position of the polygon mirror has been detected. From this perspective, identifying a plurality of reference positions is desirable for improving precision in controlling the exposure timing.

Figure 11:
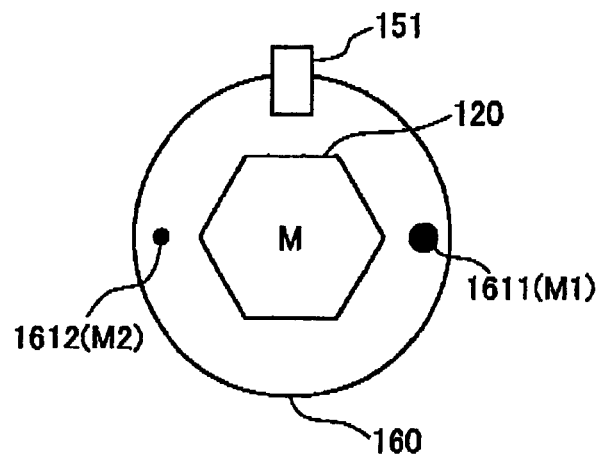
FIG. 11 is a plan view showing the vicinity of a polygon mirror according to a third embodiment.

FIG. 11 is a plan view showing the region of the polygon mirror 120 according to the third embodiment. A plurality of reference marks (two in this embodiment) is provided on the disc 160 that rotates together with the polygon mirror 120. These marks include a first reference mark 1611 of a different size than other reference marks, and a second reference mark 1612.

Figure 12:
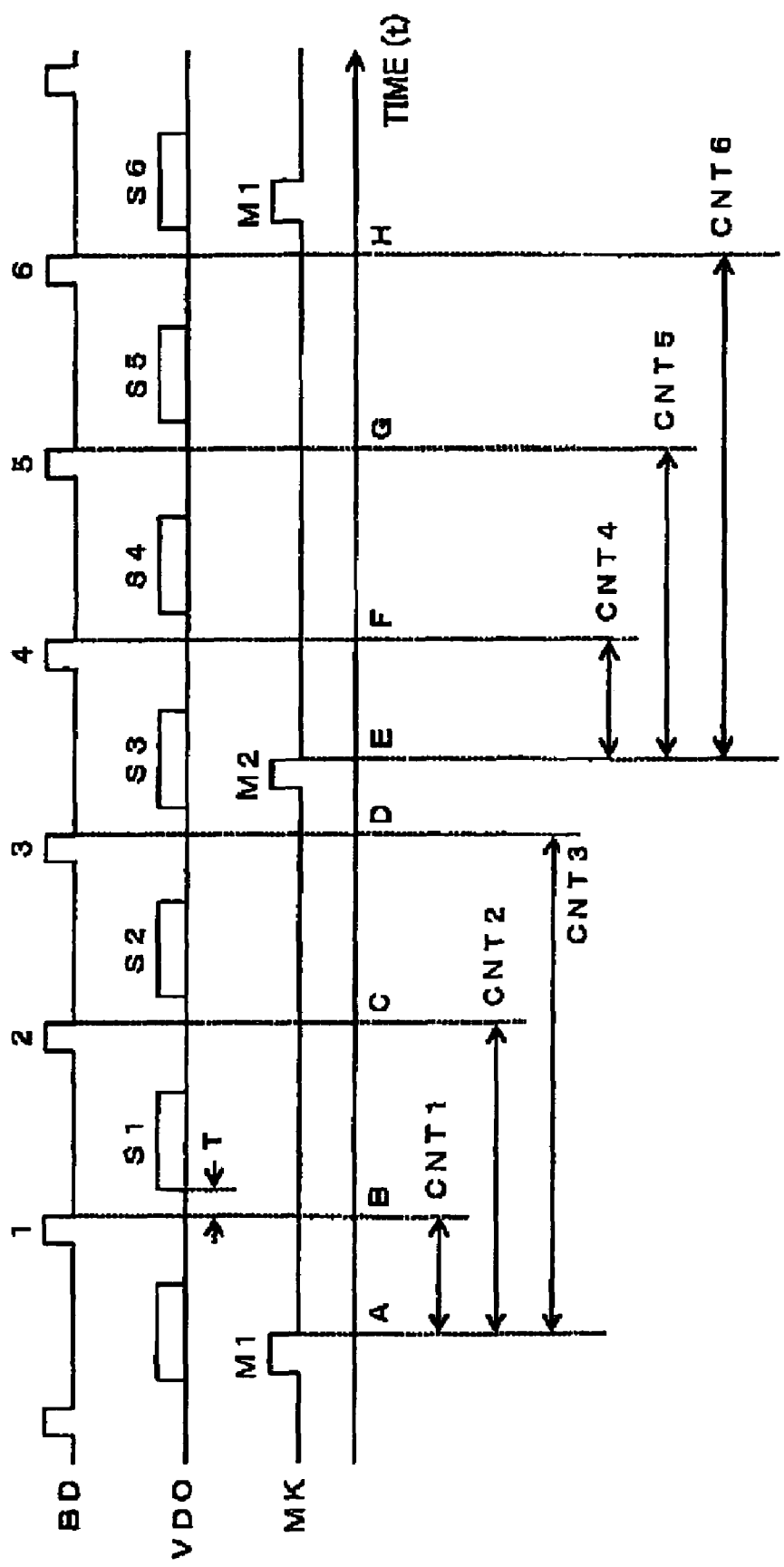
FIG. 12 is a timing chart illustrating the generation of timing data according to the third embodiment.
Figure 13:
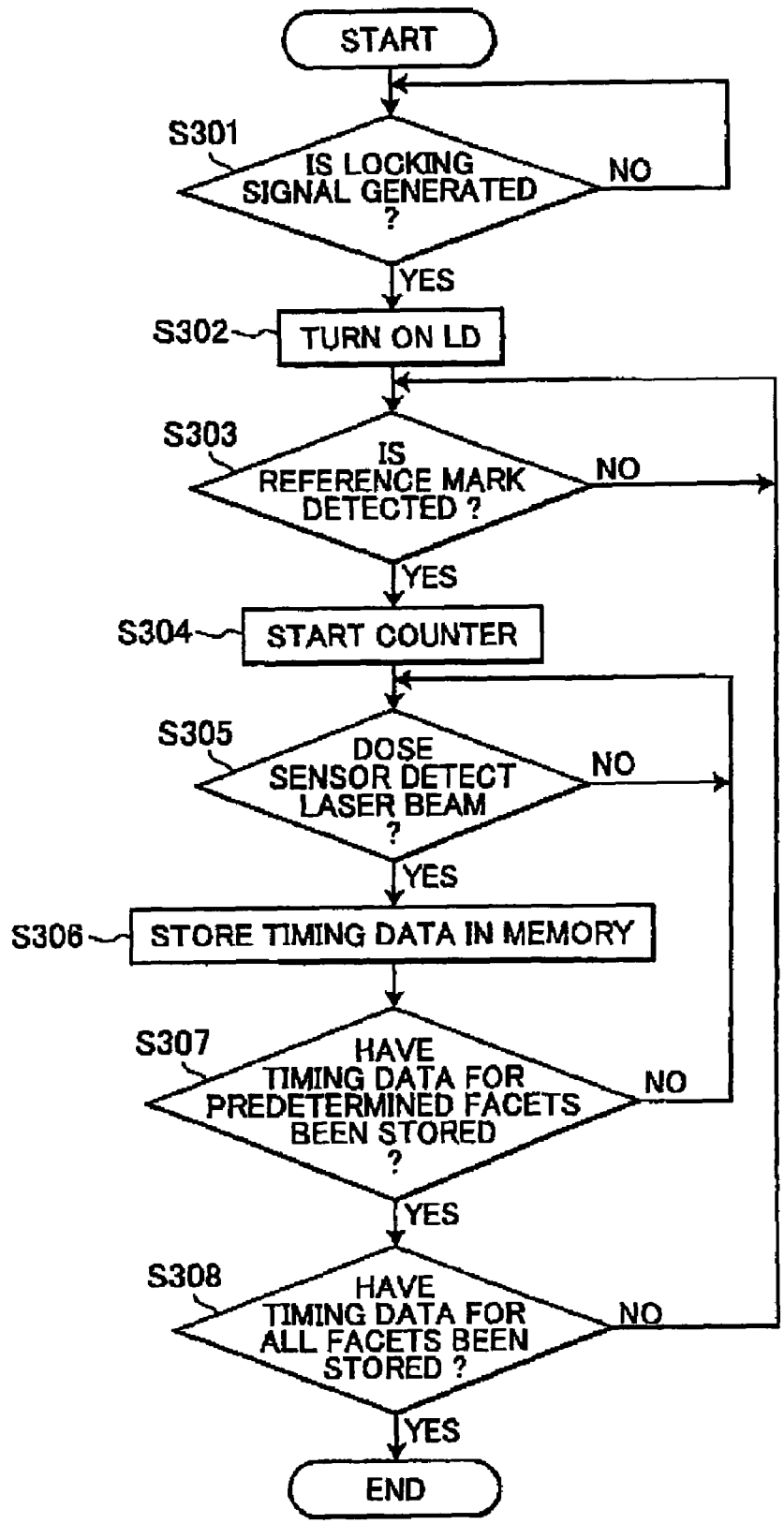
FIG. 13 is a flowchart illustrating steps in a process for generating timing data executed by a controller in the manufacturing device according to the third embodiment.

FIG. 12 is a timing chart illustrating the process of generating timing data in the third embodiment. FIG. 13 is a flowchart illustrating steps executed by the controller 250 of the measuring device 200 for generating timing data in the preferred embodiment. The following description will focus on points that differ from the process described in the first embodiment.

In S303 of FIG. 13, the controller 250 determines initially whether the first reference mark 1611 has been detected. Since the first reference mark is a different size than the other reference marks in the preferred embodiment, the first reference mark 1611 can be determined based on the pulse width of the detection signal received from the photointerrupter 151.

When the controller 250 detects that the first reference mark 1611 has passed the photointerrupter 151 (S303: YES), in S304 the controller 250 starts the counter 270 for counting the number of pulses from the reference clock. Subsequently, counter value is added to the predetermined value T, and the resultant value is then sequentially stored in the memory device 180 as timing data in S306. When the controller 250 determines that timing data has been stored for all facets of the polygon mirror corresponding to the first reference mark 1611 (three facets in the preferred embodiment; S307: YES), then the controller 250 returns to S303 and waits until the second reference mark 1612 has been detected.

The process performed after the second reference mark 1612 is detected can be considered identical to that performed after the first reference mark 1611 was detected. The first reference mark 1611 is configured to be identifiable from other reference marks because it would be unclear which reference mark corresponds to which facets of the polygon mirror if a plurality of reference marks having the same formation were provided.

Further, in the preferred embodiment, it is preferable to save some type of data identifying the correspondences between reference marks and mirror facets. For example, by storing data indicating that the first reference mark corresponds to three mirror facets and that detection signals from the sensor 220 are generated three times, help the controller 250 can more easily determine when to wait until the next reference mark has been detected. The above description is not limited to a disc 160 provided with two reference marks, but can be applied when three or more reference marks are provided.

From the perspective of improving precision in controlling exposure timing, it is desirable to reduce the time from the moment the reference mark is detected until the sensor 220 detects the laser beam, in other words, to reduce the count value of the counter as much as possible, and to stipulate correspondences between each reference mark and the mirror facets. In the example of FIG. 12, it is possible to store count values based on the correspondence between the first reference mark 1611 (Ml) and the sixth mirror facet (S6). In other words, any correspondence can be defined and need not be limited to the correspondence between the first reference mark 1611 (Ml) and the first through third mirror facets (S1, S2, and S3).

Figure 14:
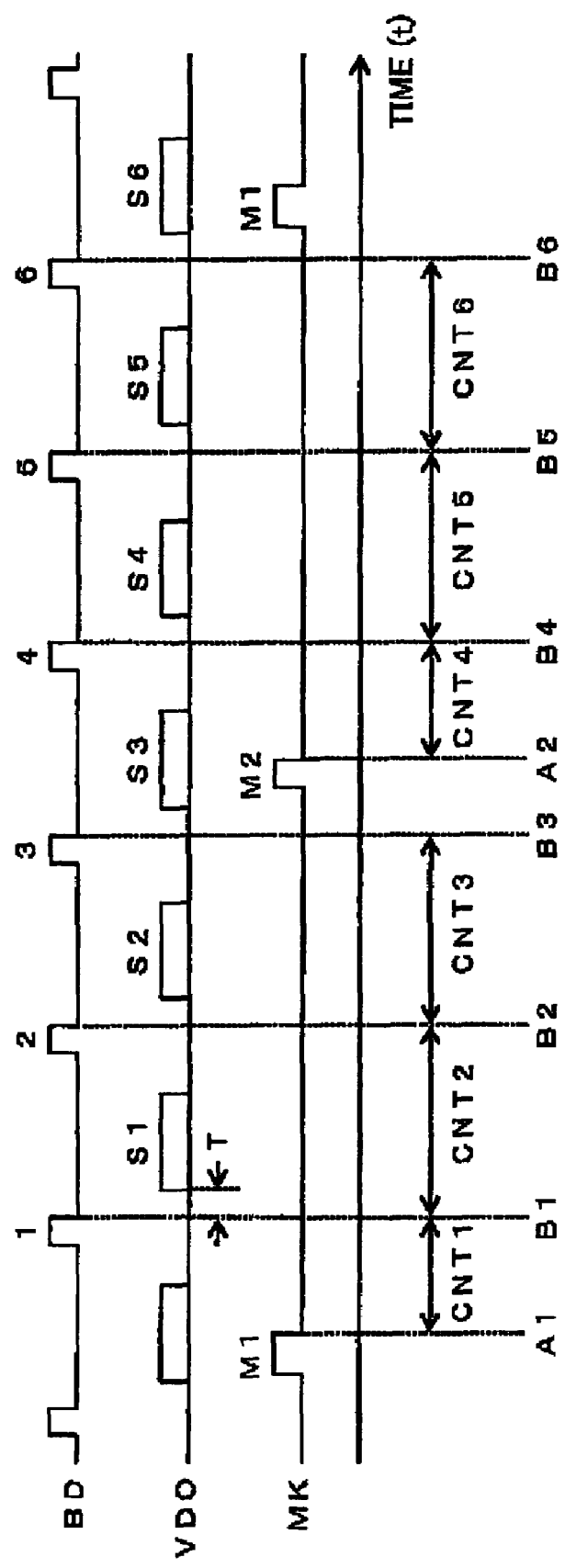
FIG. 14 is a timing chart illustrating count values when the value of a counter according to the third embodiment is cleared after acquiring each count value.
Figure 15:
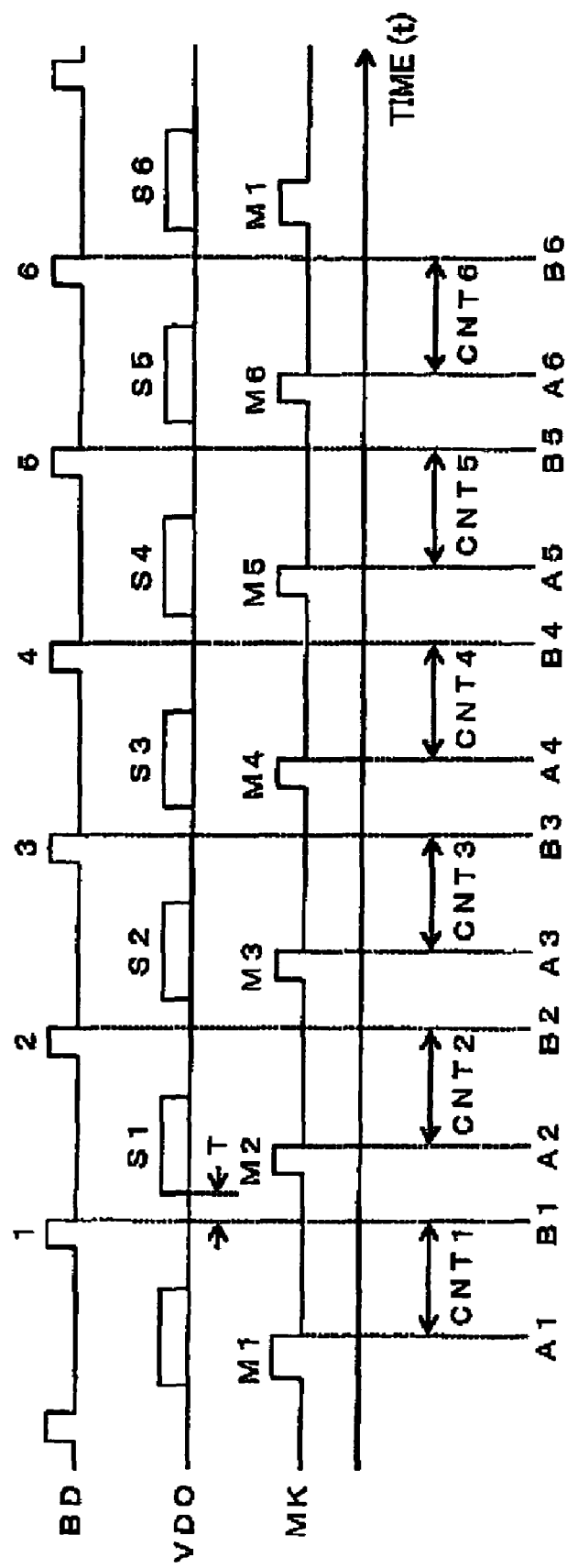
FIG. 15 is a timing chart illustrating timing data when a reference mark is provided for each facet of the polygon mirror in the third embodiment.

Further, in the example described in FIG. 12, the counter values CNT1, CNT2, and CNT3 are sequentially stored after the first reference mark 1611 is detected. However, the value of the counter 270 may be cleared after each counter value is obtained, for example. FIG. 14 is a timing chart showing the count values in such a case. As shown in FIG. 14, the value for the counter 270 is cleared at the timing B1 when the detection signal from the sensor 220 is first acquired. The count value CNT2 then indicates the length of time from the timing 51 to the timing B2. Numerous variations in the form and content of such timing data are conceivable and have no particular restrictions. The method most preferable from the perspective of improving exposure timing control is to provide one reference mark corresponding to each facet of the polygon mirror, as illustrated in FIG. 15.

Figure 16:
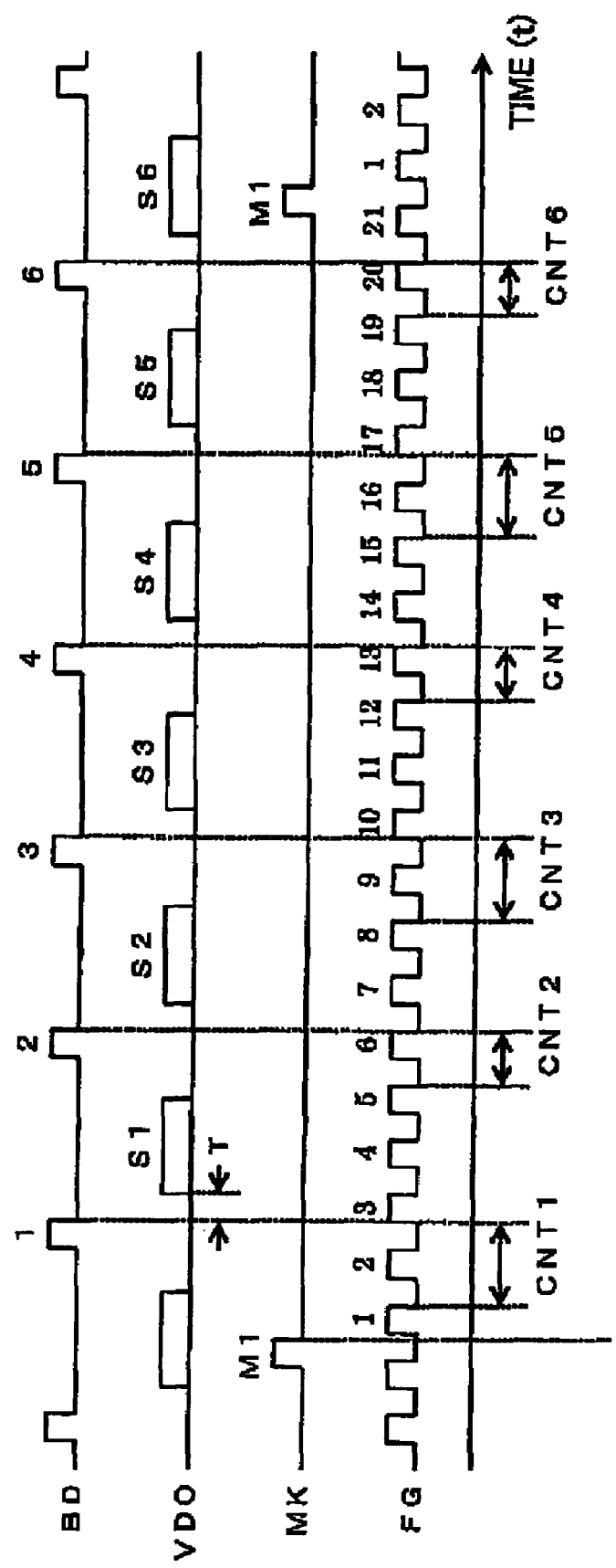
FIG. 16 is a timing chart illustrating a method of generating timing data according to a fourth embodiment using an FG signal.

The final description covers a method of acquiring data representing the rotational status of the polygon mirror drive motor from the motor drive unit and using this data to generate timing data. This method will be described while referring to the timing chart in FIG. 16. In FIG. 16, "FG" represents a frequency generator (FG) signal outputted from the motor driver when using a brushless DC motor, for example. Further, the data in FIG. 16 merely represents a conceptual example for describing the concept of the preferred embodiment. The pulse number in an actual FG signal may differ considerably.

As described above, when forming images without a BD sensor, it is desirable to reduce the counting time of the counter as much as possible to avoid a decline in precision caused by an irregular rotation of the motor. The preferred embodiment uses an FG signal together with the reference marks to reduce the count value. The output source of the FG signal may be implemented with Hall elements provided in a brushless DC motor or magnetized patterns. Either case is applicable in the present invention.

In the example of FIG. 16, only one reference mark has been provided. In the preferred embodiment, timing data is generated using the first pulse of the FG signal occurring immediately after the reference mark 161 is detected, and the count values (CNT1 and the like) are set to the length of time from the timing corresponding to a prescribed FG signal pulse until a detection signal is obtained from the sensor 220. Timing data corresponding to the second facet of the mirror is generated based on timing for the fifth pulse in the FG signal. Timing data corresponding to the remaining facets are calculated similarly.

In this method, it is desirable to save correlations between each mirror facet and the pulse number of the FG signal. In the example of FIG. 16, the first pulse of the FG signal corresponds to the mirror facet S1 and the fifth pulse of the FG signal corresponds to the mirror facet S2. These and the other correlations may be saved in nonvolatile memory provided in the scanning unit or on an external server. It is also preferable to provide a second counter for counting the pulse number in the FG signal in addition to the counter provided to count the pulse number of the reference clock when generating timing data and forming images.

By generating timing data according to the method described above, it is possible to further reduce the count value, thereby suppressing a decline in precision caused by rotational irregularities of the motor. During image formation, the exposure timing can be controlled by counting the pulse number from the reference clock after the pulse number of the FG signal reaches a prescribed pulse number.

While the invention has been described in detail with reference to specific embodiments thereof, it would be apparent to those skilled in the art that many modifications and variations may be made therein without departing from the spirit of the invention, the scope of which is defined by the attached claims.

(1) In order to generate timing data in the embodiments described above, the scanning unit 100 is provided with the beam passage window 170 through which a laser beam can pass and be detected by the sensor 220. Generally, the process for generating timing data described above is conducted in a clean environment with no dust. Further, it is necessary to hermetically seal the scanning unit before mounting the unit in an image-forming device. Accordingly, the beam passage window 170 must be sealed off after the timing data has been generated. However, by providing glass in the beam passage window 170 initially, the process for sealing the passage window after generating timing data can be eliminated.

(2) In the second embodiment described above, timing data is transmitted to the server 400 along with an identifier assigned to the scanning unit. This identifier is then saved in the motor driver (LSI). However, identification of the scanning unit may be managed using barcodes affixed to the unit. When acquiring timing data, the user may input the identifier using operating buttons on the laser printer and acquire the timing data from a server, or use a barcode reader or other scanning device to read the identifier from the barcode.

(3) In the embodiments described above, an opaque reference mark is provided on a transparent disc 160 as the method for defining a reference position with respect to the peripheral surface of the polygon mirror, but there are many conceivable methods for defining a reference position, such as providing a transparent reference mark on an opaque disc 160 or varying the transmittance or reflectance on a portion of the disc 160 itself. Further, when a plurality of reference marks is used, the method of distinguishing one reference mark from the others is not limited to varying the size of the mark. For example, one of the reference marks can be made distinguishable by varying its reflectance or transmittance.

(4) In the third embodiment described above, a plurality of reference marks is provided and timing data is generated by actually measuring the length of time from a timing at which each reference mark is detected until the sensor 220 detects the laser beam. However, since generating actual timing data and storing the data in nonvolatile memory such as EEPROM or Flash ROM can lead to increases in manufacturing costs, it may be desirable not to generate actual timing data, particularly for inexpensive models. Even so, using a plurality of reference marks can improve the precision and exposure timing control over scanning devices that use only a single reference mark, as in the conventional technology disclosed in patent reference 1. Since it is not necessary to provide the scanning unit with EEPROM and Flash ROM in this case, manufacturing costs can be kept down. This is preferable when applying the present invention to an inexpensive image-forming device.

What is claimed is:

1. An image-forming device comprising: a photosensitive member and a scanning unit that scan the photosensitive member with a light beam, the scanning unit comprising:

a light emitting unit that emits the light beam;

a polygon mirror having a plurality of facets, each of the plurality of facets deflects the light beam to the photosensitive member;

a driving unit that rotates the polygon mirror;

a reference mark that revolves together with the polygon mirror, the reference mark indicating a reference position of the polygon mirror;

a reference mark detecting unit that detects the reference mark; and a memory unit that saves a length of a time period from a first time to a second time for one of the plurality of facets when the polygon mirror is rotating, the first time being when the reference mark detecting unit detects the reference mark, the second time being when the light beam deflected by the one of the plurality of facets arrives at the photosensitive member; and a controller that starts modulating the light beam with image data when the time period has elapsed after the reference mark detecting unit detects the reference mark.

2. The image-forming device according to claim 1, wherein the reference mark detecting means has a sensor that optically detects the reference mark.

3. The image-forming device according to claim 1, wherein the reference mark is provided on one of the polygon mirror and a member that rotates together with the polygon mirror.

4. The image-forming device according to claim 1, further comprising a timer that measures elapsed time after the reference mark detecting unit detects the reference mark;
wherein the controller controls the light-emitting unit to begin irradiating a light beam modulated according to image data when the elapsed time measured by the timer is equal to the length of the time period.

5. The image-forming device according to claim 4, further comprising a reference clock generator that generates a reference clock pulse which is counted by the timer;
wherein the length of the time period is equal to a number of reference clock pulses generated by the reference clock generator during the time period,
the timer includes a counter that counts the reference clock pulse generated by the reference clock.

6. The image-forming device according to claim 1, wherein the memory unit obtains the length of the time period from an external device.

7. The image-forming device according to claim 1, wherein the reference mark includes a plurality of reference marks, each of the plurality of reference marks is distinguishable from the others of the plurality of reference marks,
the controller measures a length of a time period from a third time to the second time, the third time being when the reference mark detecting unit detects one of the plurality of reference marks.

8. The image-forming device according to claim 7, wherein the plurality of reference marks is restricted to a one-on-one correspondence with each facet of the polygon mirror.

9. The image-forming device according to claim 1, wherein the driving unit comprises a frequency generator (FG) signal generating unit that generates a signal having a frequency corresponding to a rotational speed of the polygon mirror; and
the length of the time period indicates a length of time from a prescribed timing obtained from an output signal from the FG signal generating unit after the reference nmrk detecting unit detects the reference mark until the second time, while the polygon mirror is rotating at a constant speed.

10. A scanning unit that scans a photosensitive member, comprising:
a light-emitting unit that emits a light beam;
a polygon mirror having a plurality of facets, each of the plurality of facets deflects the light beam to the photosensitive member;
a driving unit that rotates the polygon mirror;
a reference mark that revolves together with the polygon mirror, the reference mark indicating a reference position of the polygon mirror;
a reference mark detecting unit that detects the reference mark; and a memory unit that saves a length of a time period from a first time to a second time for one of the plurality of facets when the polygon mirror is rotating, the first time being when the reference mark detecting unit detects the reference mark, the second time being when the light beam deflected by the one of the plurality of facets arrives at the photosensitive member.

11. A measuring device that measures a scanning unit, the scanning unit having a light-emitting unit that emits a light beam, a polygon mirror that deflects the light beam, a driving unit that rotates the polygon mirror, a reference mark that revolves together with the polygon mirror and indicates a reference position of the polygon mirror, a reference mark detecting unit that detects the reference mark, and a window that pass through the light beam deflected by the polygon mirror, comprising:
a scanning unit mounting section that receives the scanning unit; and
a light beam receiving unit that receives the light beam passing through the window; and
a calculating unit that calculates a length of a time period from a first time to a second time, the first time being when the reference mark detecting unit detects the reference iriark while the polygon mirror is rotating at a constant speed, the second time being when the light beam receiving unit receives the light beam.

12. The measuring device according to claim 11, further comprising a transmitter that transmits the length of the time period calculated by the calculating unit to an external device.

13. A measuring system comprising: a measuring device that measures a scanning unit, the scanning unit having a light-emitting unit that emits a light beam, a polygon mirror that deflects the light beam, a driving unit that rotates the polygon mirror, a reference mark that revolves together with the polygon mirror and indicates a reference position of the polygon mirror, a reference mark detecting unit that detects the reference mark, a window that pass through the light beam deflected by the polygon mirror, and a controller having a memory unit;
the measuring device further including: a scanning unit mounting section that receives the scanning unit; a light beam receiving unit that receives the light beam passing through the window; a calculating unit that calculates a length of a time period from a first time to a second time, the first time being when the reference mark detecting unit detects the reference mark while the polygon mirror is rotating at a constant speed, the second time being when the light beam receiving unit receives the light beam; and a transmitter that transmits the length of the time period calculated by the calculating unit to an external device; wherein
the controller saves the length of the time period transmitted by the transmitter to the memory unit.

14. A method for manufacturing a scanning unit, comprising:
providing a scanning unit including:
a light-emitting unit that emits a light beam;
a polygon mirror that deflects the light beam;
a driving unit that rotates the polygon mirror;
a reference mark that revolves together with the polygon mirror;
a reference mark detecting unit that detects the reference mark; and
a window that pass through the deflected light beam;
measuring a length of a time period from a first time to a second time while the polygon mirror is rotating at a constant speed, the first time being when the reference mark detecting unit detects the reference mark, the second time being when the light beam deflected by the polygon mirror passes through the window; and storing the measured length of time.

15. An image-forming device comprising:
a light emitting unit that emits a light beam;
a polygon mirror having a plurality of facets, each of the plurality of facets deflects the light beam;
a driving unit that rotates the polygon mirror;
a photosensitive member having a photosensitive surface to be scanned with the light beam deflected by the polygon mirror;
a reference mark that revolves together with the polygon mirror, the reference mark indicating a reference position of the polygon mirror;
a reference mark detecting unit that detects the reference mark;
a memory unit that saves a length of a time period from a first time to a second time for each one of the plurality of facets when the polygon mirror is rotating, the first time being when the reference mark detecting unit detects the reference mark, the second time being when the light beam deflected by the one of the plurality of facets arrives at the photosensitive surface of the photosensitive member; and
a controller that starts modulating the light beam with image data when the time period has elapsed after the reference mark detecting unit detects the reference mark.

16. An image-forming device comprising: a photosensitive member and a scanning unit that scan the photosensitive member with a light beam,
the scanning unit comprising:
a light emitting unit that emits the light beam;
a polygon mirror having a plurality of facets, each of the plurality of facets deflects the light beam to the photosensitive member;
a driving unit that rotates the polygon mirror;
at least two reference marks that revolve together with the polygon mirror, each of the at least two reference marks indicating a reference position of the polygon mirror;
a reference mark detecting unit that detects each of the at least two reference marks; and
a memory unit that saves a length of a time period from a first time to a second time for one of the plurality of facets when the polygon mirror is rotating, the first time being when the reference mark detecting unit detects one of the at least two reference marks, the second time being when the light beam deflected by the one of the plurality of facets arrives at the photosensitive member; and
a controller that starts modulating the light beam with image data when the time period has elapsed after the reference mark detecting unit detects the one of the at least two reference marks.

17. The image-forming device according to claim 16, wherein each of the plurality of facets has one reference mark, and
the memory unit saves a length of a time period from a first time to a second time for each of the plurality of facets when the polygon mirror is rotating, the first time being when the reference mark detecting unit detects the reference mark, the second time being when the light beam deflected by the each of the plurality of facets arrives at the photosensitive member.

* * * * *